United States Patent
Kato (10) Patent No.: US 6,240,529 B1
(45) Date of Patent: May 29, 2001

(54) DEBUGGING METHOD AND DEBUGGING APPARATUS FOR MICROCOMPUTER SYSTEM AND RECORDING MEDIUM ON WHICH DEBUG PROGRAM IS RECORDED

(75) Inventor: Mikiko Kato, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/089,408

(22) Filed: Jun. 3, 1998

(30) Foreign Application Priority Data

Jun. 4, 1997 (JP) ................................................ 9-146248

(51) Int. Cl.[7] ................................................ G06F 11/00
(52) U.S. Cl. ................................ 714/33; 714/38; 717/4
(58) Field of Search ................................ 714/30, 33, 38, 714/39, 47; 717/4, 5, 11

(56) References Cited

U.S. PATENT DOCUMENTS

| 5,124,989 | | 6/1992 | Padawer et al. ........................ 371/19 |
| 5,428,618 | * | 6/1995 | Ueki et al. .............................. 717/4 |
| 5,794,046 | * | 8/1998 | Meier et al. ............................ 717/4 |
| 5,867,644 | * | 2/1999 | Ranson et al. ......................... 714/39 |
| 5,978,584 | * | 11/1999 | Nishibata et al. ...................... 717/4 |

FOREIGN PATENT DOCUMENTS

| 3-127234 | 5/1991 | (JP) . |
| 5181702 | 12/1991 | (JP) . |
| 4-68446 | 3/1992 | (JP) . |
| 6222952 | 1/1993 | (JP) . |
| 7-64820 | 3/1995 | (JP) . |
| 7-191875 | 7/1995 | (JP) . |

* cited by examiner

*Primary Examiner*—James P. Trammell
*Assistant Examiner*—Pierre Eddy Elisca
(74) *Attorney, Agent, or Firm*—Foley & Lardner

(57) ABSTRACT

If an event set in advance is detected by state storage event detection unit 119 when an instruction is executed, then this is reported from state storage event occurrence reporting unit 120 to state storage unit 116, by which state storage file 118 is produced. Simultaneously, a state storage file name and a situation upon the storage are stored in a correlated condition into storage situation management file 122 by storage situation management unit 121. When a certain debugged state is to be restored, by referring to the information, the state storage file can be determined readily from among existing state storage files.

4 Claims, 8 Drawing Sheets

| STATE STORAGE FILE NAME | STORAGE TIME | PROGRAM NAME | EXECUTION UPON RESTORATION | EVENT CONDITION |
|---|---|---|---|---|
| test1.prj | 3/6/97 10:34 | test.c | 000000B4 | 1. 000000B4 M1 |
| test2. prj | 3/6/97 10:35 | test.c | 000000B8 | 2. R0 = 0 x 02 WP |
| ... | ... | ... | ... | ... |

| Frame | Time | Address | Data | Status | Address | Data | Status | jmpadd | DisAsm | | StatusFileName |
|---|---|---|---|---|---|---|---|---|---|---|---|
| 401 | 402 | 403 | | | 404 | | | 405 | 406 | | 407 |
| . . | . . | . . | . . | . . | . . | . . | . . | . . | . . | | . . |
| 04073 | 2 | 0000B4 | AF | M1 | | | | | | | test1.prj |
| 04074 | | 0000B5 | 01 | OP | | | | | CMP | A,#1H | |
| 04075 | | | | | 00FEF1 | 01 | RP | | | | |
| 04076 | 2 | 0000B6 | 80 | M1 | | | | | | | |
| 04077 | | 0000B7 | 06 | OP | | | | | BNZ | $L2 | |
| 04078 | 4 | 0000B8 | 24 | M1 | | | | | | | |
| 04079 | | 0000B9 | 01 | OP | | | | | MOV | R0, R1 | |
| 04080 | | | | | 00FEF1 | 01 | RP | | | | |
| 04081 | | | | | 00FEF0 | 01 | WP | | | | test2.prj |
| . . | . . | . . | . . | . . | . . | . . | . . | . . | . . | | . . |

DEBUGGING METHOD AND DEBUGGING APPARATUS FOR MICROCOMPUTER SYSTEM AND RECORDING MEDIUM ON WHICH DEBUG PROGRAM IS RECORDED

BACKGROUND OF THE INVENTION

1. Field of the Invention

This invention relates to a debugging method and a debugging apparatus for a microcomputer system and a recording medium on which a debug program is recorded. More specifically, the present invention relates to a debugging method and a debugging apparatus wherein a debugged state of a system at a certain point of time during operation of the system is stored and thereafter restored to perform re-execution from the point of time and a recording medium on which a debug program for the debugging method and the debugging apparatus is recorded.

2. Description of the Related Art

When it is tried to develop a system newly, it must be verified in a debugging step or an inspection step whether or not a program for use with the system operates correctly as intended by a designer. In those steps, the program is inputted to a debugging apparatus so that simulation of operation or debugging is performed by the debugging apparatus. In this instance, unless specified specifically, the debugging apparatus starts its simulation beginning at the top of the program.

However, in the debugging step or inspection step for a program, debugging or inspection is in most cases performed based on an operation test procedure prepared by a designer of the program for confirming whether or not the system operates in accordance with the specifications. Then, if correct operation continues up to a portion of the program and thereafter false operation is performed, then the location is detected, and the program is corrected based on a result of the detection. Then, the debugging or inspection is repeated after it is confirmed that the corrected portion of the program is now operating correctly.

In short, in the process above, there is correct operation up to a specific point of time in the program, and when a state of incorrect operation is detected at a next point of time the program is repaired, correct operation is reconfirmed and the operation is repeated to check if there is a subsequent place of incorrect operation.

Thus, in order to perform a debugging operation efficiently, a function to restore a debugged state at a certain point of time and perform re-execution of a program beginning at a place in the program other than the top is required.

In conventional debugging methods and debugging apparatus, as a function to restore a debugged state at a certain point of time to allow re-execution from that point of time, two functions of a back execution function and a function to hold state are available. The back execution function is a function to store, when an instruction is executed, information of a memory, a register and so forth whose states have changed as a result of the execution of the instruction into a buffer for exclusive use and to return, upon back execution, the debugged state in accordance with the stored contents of the buffer by one-by-one instruction to the condition prior to the execution condition. The function to hold a state is a function to store a debugged state at certain point of time into a state storage file and, when it is desired to restore the debugged state at that point of time, the debugged state is restored by reading in the state storage file.

Figure 1:
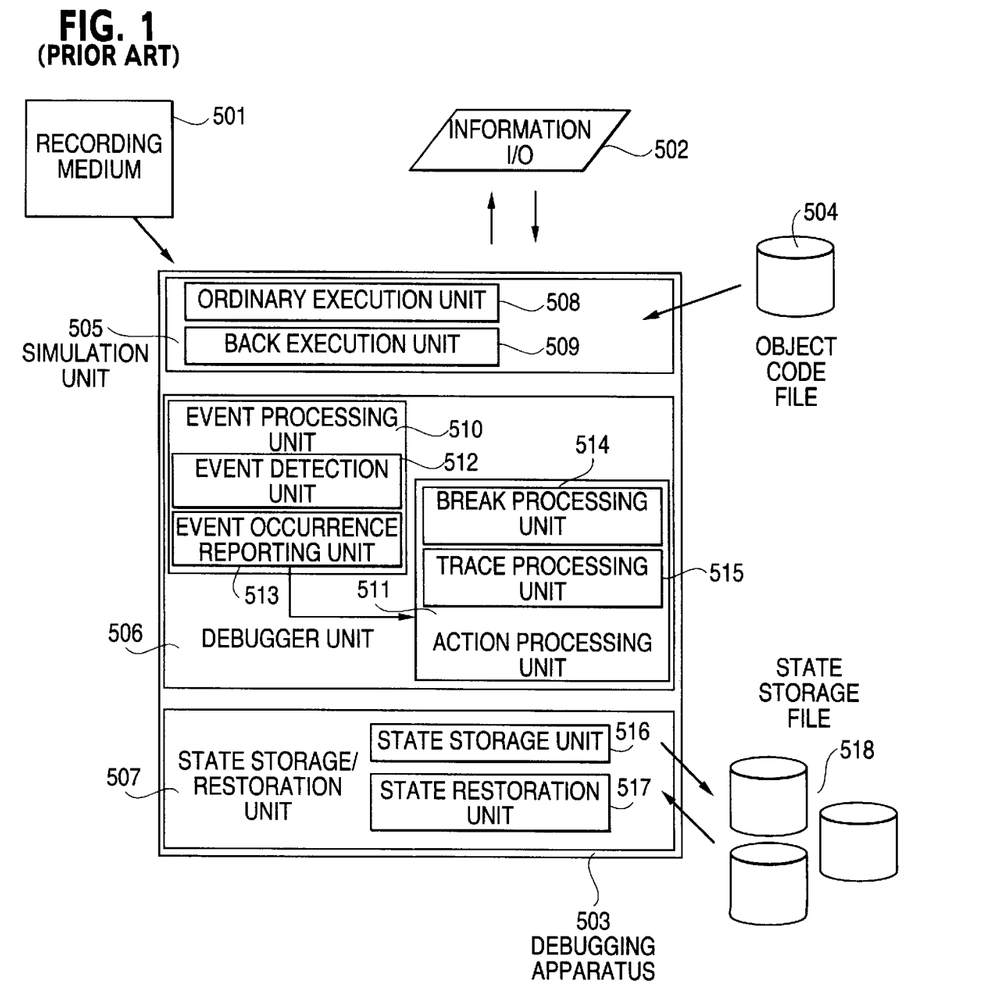
FIG. 1 is a prior art that show a system construction of a conventional debugging apparatus.

A conventional debugging apparatus is described in detail with reference to the drawings. FIG. 1 is a diagrammatic view showing a system construction of a conventional debugging apparatus.

Recording medium 501 has a debug simulation program recorded thereon. Contents of the program are written into debugging apparatus 503 and used to control operation of simulation unit 505, debugger unit 506, state storage/restoration unit 507 and so forth which are components of debugging apparatus 503. Debugging apparatus 503 performs simulation or debugging processing in response to an inputted command from information IN/OUT apparatus 502. Upon starting of debugging, a down load command is inputted from information IN/OUT apparatus 502 to down load object code file 504 of a program, which is an object of debugging, to debugging apparatus 503.

Simulation unit 505 in debugging apparatus 503 executes the down loaded program by one-by-one instruction by ordinary execution unit 508. If a command to acquire information for back execution has been issued prior to the execution, then each time an instruction is executed, the value of a register, a memory or the like which has been changed by the instruction is stored into a buffer for an exclusive use of back execution unit 509. When a back execution command is issued, back execution unit 509 restores the state prior to execution of an instruction by one-by-one instruction using the information stored in the buffer.

Debugger unit 506 in debugging apparatus 503 performs processing regarding a debugging function for breaking, tracing and so forth. A break point at which execution of a program is interrupted when a certain event occurs or a trace are recorded, and an instruction execution situation, a memory access situation or the like at a point of time when a certain event occurs, is set by an individual command. Events and actions, such as breaking, tracing and so forth when such events occur, which are set by such commands, are registered in event processing unit 510 and action processing unit 511 in debugger unit 506, respectively, and are processed in the following manner when the instructions are executed.

In event processing unit 510, each time one instruction is executed, it is checked by event detection unit 512 whether or not a state which corresponds to any of the event conditions set in advance has occurred, and if an event is detected, then this is reported to action processing unit 511 through event occurrence reporting unit 513. Action processing unit 511 checks whether or not an action which originates from the event reported thereto is included in the actions registered in advance therein, and if the action is a registered one, then processing of the action is performed by a suitable one of break processing unit 514, trace processing unit 515 and so forth.

In state storage/restoration unit 507 in debugging apparatus 503, state storage unit 516 stores a debugged state into state storage file 518 when a debugged state storage command is issued or at a predetermined timing determined for the debugging apparatus. Predetermined timing here signifies a timing after several instructions are executed or several commands are issued or when simulation/debugging comes to an end. State restoration unit 517 performs, when a state restoration command is issued, based on an arbitrary one of state storage files 518, processing to return the debugged state to the state when the file was stored.

Figure 2A:
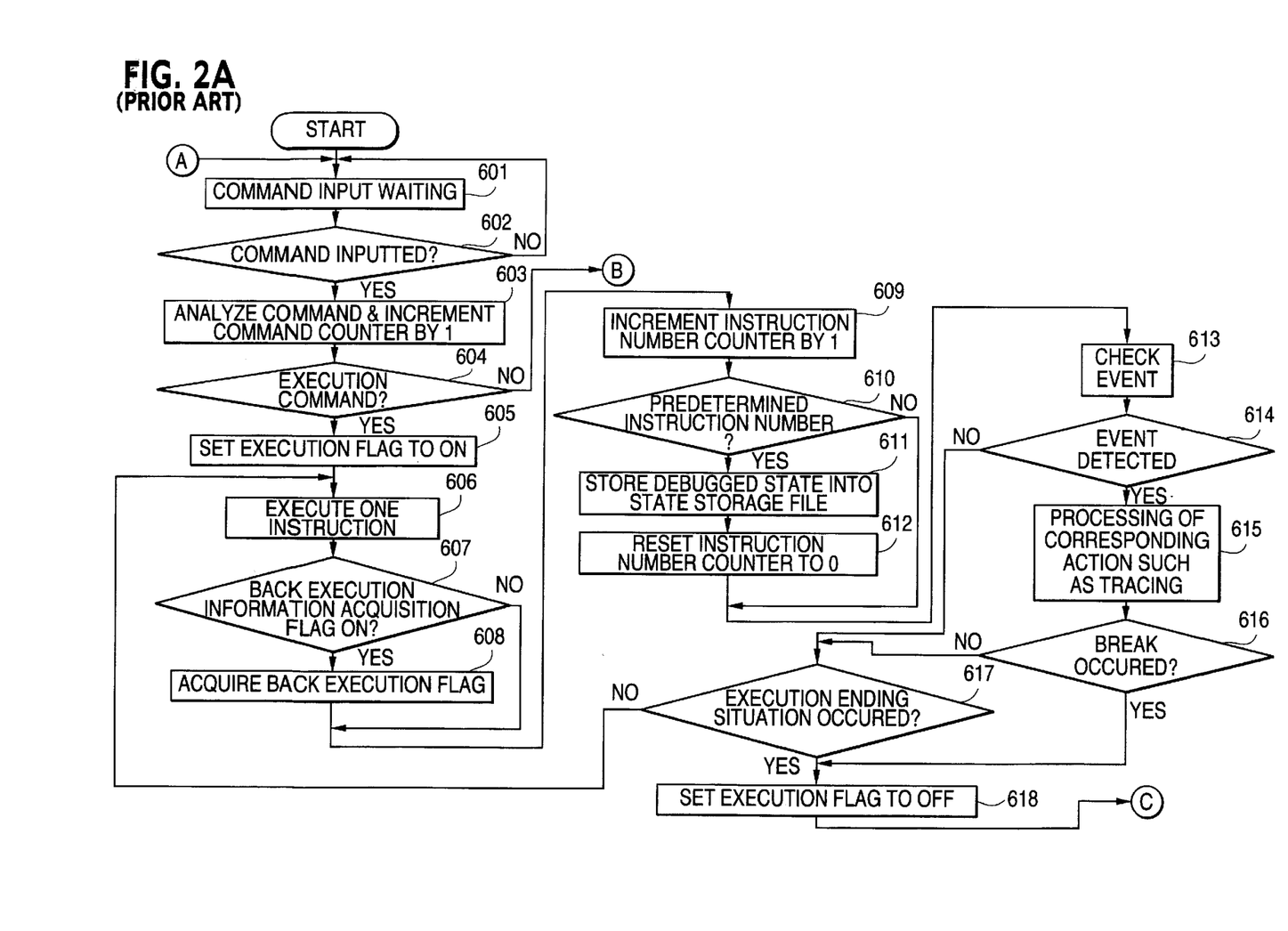
FIG. 2A is a prior art that illustrate a processing flow of a conventional debugging method.
Figure 2B:
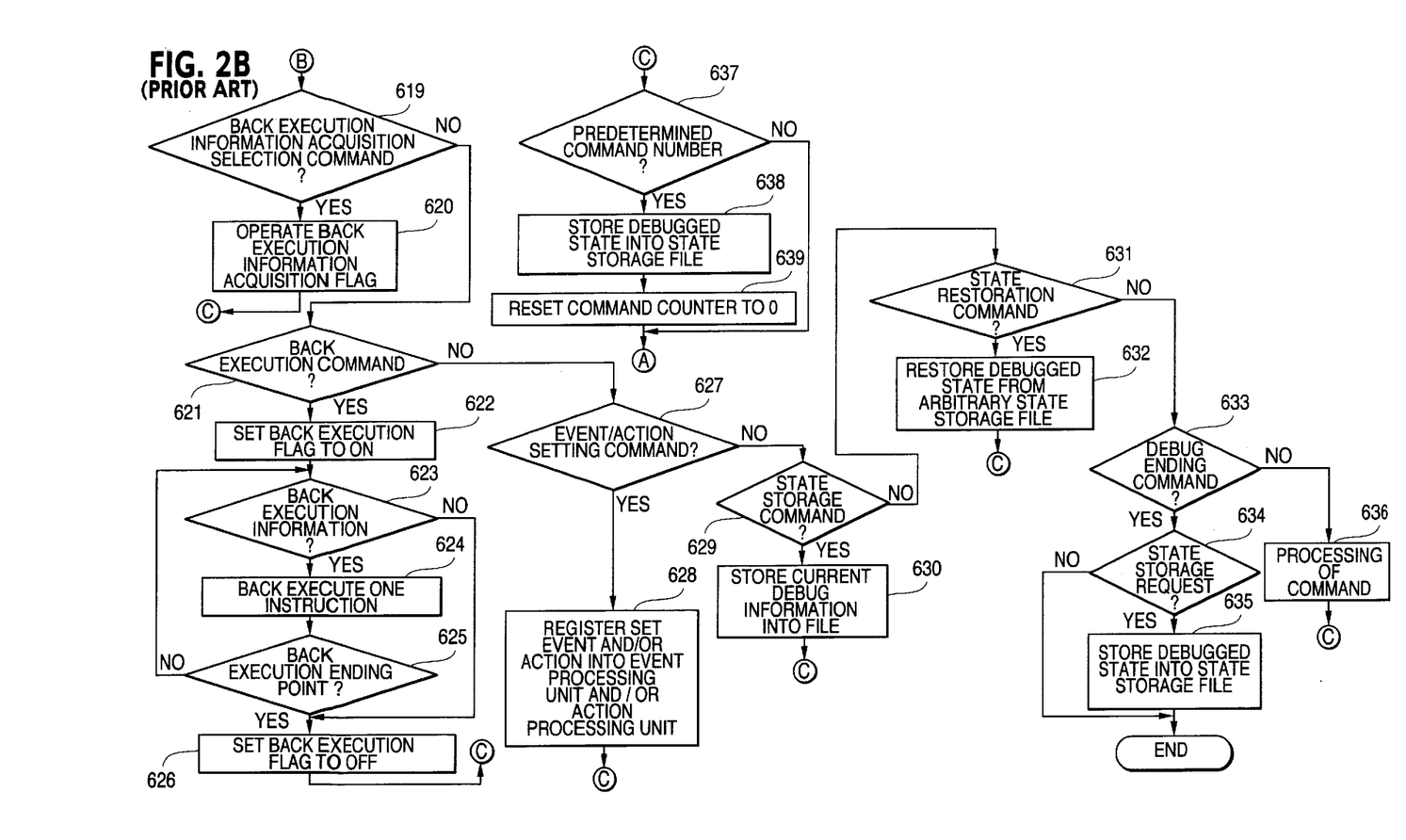
FIG. 2B is a prior art that illustrate a processing flow of the conventional debugging method.

A conventional debugging method is described in detail with reference to the drawings. FIGS. 2A and 2B are flow charts illustrating a processing flow of a conventional debugging method.

The debugging apparatus when started enters a command input waiting mode (601) so that it receives an inputted command from a user and performs an operation conforming to the command to realize simulation or debugging. If a command is inputted (602), then the debugging apparatus analyzes the command. In this instance, if a debugged state changes as a result of processing of the command, then a command counter is incremented (603). If a result of the command analysis reveals that the command is an execution command (604), then an execution flag is set to ON (605) and one instruction is executed (606).

Then, debugging processing which is to be processed incidentally to the execution of one instruction is performed. First, if a back execution information acquisition flag is ON (607), then information of a memory, a register or the like which has changed as a result of the execution of the instruction is stored into a back execution information storage buffer (608). The ON/OFF operation of the back execution information acquisition flag is performed with a back execution information acquisition selection command as hereinafter described. Then, a counter for counting the number of instructions executed is incremented (609), and if the counter value becomes equal to an instruction number determined by the system of the debugging apparatus (610), then the current debugged state is stored into a state storage file (611) and the instruction number counter is reset to 0 (612). Further, it is checked whether or not, as a result of the execution of the command, a state which corresponds to any of events registered by the user is satisfied (613), and if such an event is detected (614), then processing of an action registered in correlation with the event is performed (615).

This action may be acquisition of trace information, a request for a break or the like. If the action is a request for a break (616), then the execution flag is changed to OFF (618), thereby ending the processing. When no event is detected or after action processing other than breaking correlated to an event is completed, it is confirmed whether or not an execution ending situation has occurred (617), and if an execution ending situation has occurred, then the execution flag is changed to OFF (618). In any other case, a next instruction is executed (606). A situation in which it is necessary to end the execution may be a case wherein a compulsory ending requesting command is issued or an execution ending address designated by an execution command is reached. Further, such registration of an event or an action as described above is performed using an event setting command or an action setting command as hereinafter described.

If a back execution information acquisition selection command is inputted to the debugging apparatus (619), then the back execution information acquisition flag is set to ON when it is selected to acquire back execution information, but to OFF when it is selected not to acquire back execution information (620). When a back execution command is inputted (621), the back execution flag is changed to ON (622), and if back execution information is available (623), then back execution is performed one by one instruction based on the back execution information (624). If no back execution information is available, then the back execution flag is changed to OFF (626). Also when a back execution ending point designated by the user is reached (625), the back execution flag is changed to OFF (626).

If an event setting command or an action setting command for breaking, tracing of the like is inputted (627), then the set event or action information is registered into the event processing unit or the action processing unit (628). If a state storage command is inputted (629), then the current debugged information is stored into a file (630). If a state restoration command is inputted (631), an arbitrary state storage file is selected and contents of the file are read in to restore the debugged state (632). Also for the other commands, processing of the commands is performed (636).

After processing of the commands is completed, if the count value of the command counter measured in step 603 reaches the instruction number determined by the system of the debugging apparatus (637), then the current debugged state is stored into the state storage file (638) and the count value of the command counter is reset to 0 to return to a command input waiting state (601). When a debug ending command is inputted (633), it can be selected whether or not the current debugged state should be stored (634), and when necessary, storage of the current debugged state into a state storage file is performed (635), thereby ending the processing of the debugging apparatus.

As described above, with the conventional debugging apparatus and debugging method, two functions of the back execution function and the function to hold state are available as functions to restore a debugged state at a certain point of time and allow re-execution of processing from the point of time. However, with the back execution function, each time an instruction is executed, information of memory or a register which exhibits a variation as a result of execution of the instruction must be stored into a buffer for exclusive use, and therefore, from the relationship of the capacity, restoration is possible only for a limited number of instructions. Also the instruction execution performance is deteriorated by the storage processing of such variation information. Further, the conventional function to hold state can store a debugged state only at limited timings such as when a state storage command is issued, after several instructions are executed, after several commands are issued, or when debugging is completed. This, however, may result in production of a large number of files which store debugged states at locations at which no debugged state need be stored actually.

Further, much time is required also to retrieve a file with which an intended debugged state can be restored from among a large number of files. For example, in order to restore state at point of time prior to execution of a certain address of a certain function, such a sequence of operations are required that a file with which a debugged state at a preceding address nearest to the certain address can be restored is selected to restore the debugged state and then re-execution from the point of time up to a desired address is performed. If a debugged state to be re-executed is a condition at a point of time at which a certain value is written into a certain memory, then a state storage file which has stored a state prior to occurrence of the state at the point nearest to the point of time at which the value was written into the memory must be retrieved. However, with the prior art, it is difficult to retrieve the state storage file.

SUMMARY OF THE INVENTION

It is an object of the present invention to provide a debugging method and apparatus and so forth wherein, in order to solve the problems of the prior art described above, a debugged state can be stored into a file by detecting, upon execution of an instruction, an event set in advance and the debugged state can be stored at an arbitrary point of time and also retrieval of a state storage file is facilitated and restoration of the intended debugged state is facilitated by correlating and managing the state storage file and the circumstances of the file at the time of its production.

According to the present invention, taking the problems of the prior art described above into consideration, there is provided a debugging method for performing simulation and/or debugging of a microcomputer system based on a program using a debugging apparatus which includes a recording medium and an information inputting apparatus, a simulation unit having an ordinary execution unit and a back execution unit, a debugger unit having an event processing unit and an action processing unit, and a state storage/restoration unit having a state storage unit and a state restoration unit, comprising the steps of reporting, if an event set in advance is detected by the event processing unit upon execution of an instruction, the detection information from the event processing unit to the state storage unit, producing a state storage file based on the reported detection information by the state storage unit, and simultaneously storing a state storage file name and the situation upon the storage in a correlated condition into a storage situation management file by the state storage-restoration unit so that, when the debugged state is to be restored, by referring to the information, the state storage file can be determined readily from among existing state storage files.

Further, according to the present invention, there is provided a debugging apparatus for performing simulation and/or debugging of a microcomputer system based on a program, comprising a recording medium and an information inputting apparatus, a simulation unit having an ordinary execution unit and a back execution unit, a debugger unit having an event processing unit and an action processing unit, and a state storage/restoration unit having a state storage unit and a state restoration unit, the event processing unit in the debugger unit including means for detecting occurrence of an event set in advance and storing a debugged state at a point of time when the event occurs, the state storage unit in the state storage/restoration unit including means for managing a situation when the debugged state is stored.

Furthermore, according to the present invention, there is provided a recording medium on which a simulation debug program is recorded in a computer-readable manner, the simulation debug program causing a computer to execute the steps of detecting an event set in advance as a state storage event when an instruction is executed, producing a state storage file when the state storage event is detected, storing a state storage file name and a situation upon the storage in a correlated condition into a storage situation management file, and retrieving storage situation management files when a certain debugged state is to be restored.

With the debugging apparatus and the debugging method of the present invention, since the means for detecting occurrence of an event set in advance and storing a debugged state into a file is provided, the storage timing for a debugged state during execution of an instruction can be designated at an arbitrary point of time whereas it is conventionally limited to a timing determined in advance by a system of the debugging apparatus such as after several instructions are executed or several commands are issued. Consequently, production of a large number of files which store debugged conditions at locations at which state storage need not be performed actually is prevented. Further, while restoration of a debugged state at a point of time at which a certain value is written into a certain memory is difficult with conventional functions, such restoration processing is possible with the debugging apparatus and the debugging method of the present invention.

Further, since the means for managing a situation when the debugged state is stored, a state storage file with which an intended debugged state can be restored can be retrieved by referring to a list or trace information, and restoration processing of a debugged state is facilitated.

The above and other objects, features and advantages of the present invention will become apparent from the following description with reference to the accompanying drawings which illustrate examples of the present invention.

DESCRIPTION OF THE PREFERRED EMBODIMENTS

In the following, embodiments of the present invention are described in detail with reference to the accompanying drawings.

Embodiment 1

Figure 3:
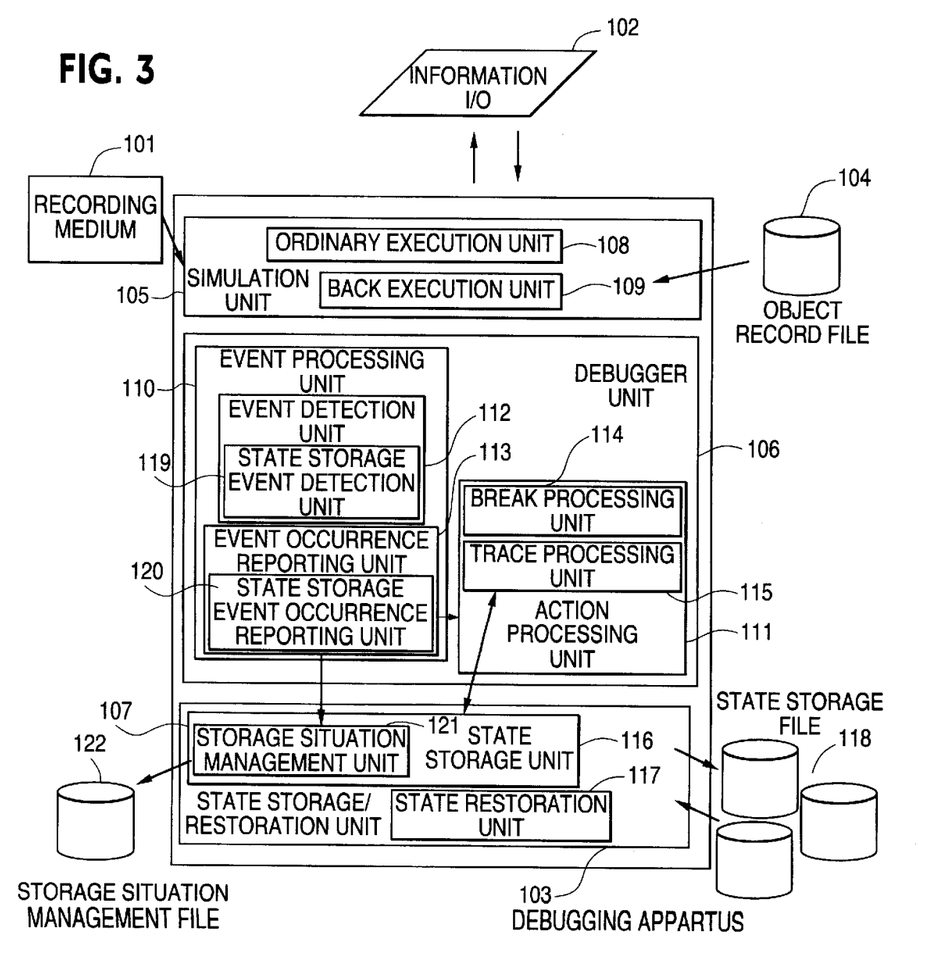
FIG. 3 is a diagrammatic view showing a system construction of a debugging apparatus of Embodiment 1.

FIG. 3 is a diagrammatic view showing a system construction of a debugging apparatus of Embodiment 1. Also debugging apparatus 103 of the present embodiment reads in a simulation debug program recorded on recording medium 101 and controls operation of simulation unit 105, debugger unit 106, state storage/restoration unit 107 and so forth which are components of debugging apparatus 103 similarly to the conventional debugging apparatus. Recording medium 101 may be a magnetic disk, a semiconductor memory or some other recording medium. Debugging apparatus 103 performs simulation or debugging processing in response to an inputted command from information IN/OUT apparatus 102. When debugging is started, a down load command is inputted from information IN/OUT apparatus 102 to down load object code file 104 of a program which is an object of debugging to the debugging apparatus.

In simulation unit 105 in debugging apparatus 103, ordinary execution unit 108 executes the down loaded program by one by one instruction. If a command to acquire back execution information is issued prior to the execution, then each time one instruction is executed, the value of a register or a memory which has been varied by the instruction is stored into a buffer for exclusive use provided in back execution unit 109. In back execution unit 109, information of a memory, a resistor or the like which exhibits a variation as a result of the execution of the instruction is stored into the buffer for exclusive use.

When a back execution command is issued, back execution unit 109 restores the state prior to execution of an instruction by one by one instruction using the information stored in the buffer.

Debugger unit 106 in debugging apparatus 103 performs processing regarding a debugging function for breaking, tracing or the like. A break point at which execution of a program is interrupted when a certain event occurs and a trace wherein, when a certain event occurs, an instruction execution situation, a memory access situation and so forth at the point of time are recorded and individually set with commands in advance. The events set with the commands and actions such as breaking and tracing when such events occur are registered in event processing unit 110 and action processing unit 111 in debugger unit 106 and are processed in the following manner when the instructions are executed.

In event processing unit 110, each time one instruction is executed, it is checked by event detection unit 112 whether or not a state corresponding to any of the event conditions set in advance has occurred, and if an event is detected, then this is reported to action processing unit 111 through event occurrence reporting unit 113. Action processing unit 111 checks whether or not an action which originates from the event reported thereto is included in the registered actions, and corresponding processing is performed by break processing unit 114, trace processing unit 115 or some other component.

The processing described above is similar to that of the conventional debugging apparatus.

In the debugging apparatus of the present embodiment, event processing unit 110 has, in addition to the conventional functions, a function of storing a debugged state into a file if a certain event occurs. Incidentally, state storage event detection unit 119 is additionally provided for event detection unit 112, and state storage event occurrence reporting unit 120 is additionally provided for event occurrence reporting unit 113. An event for performing storage processing of a debugged state if a certain event occurs is registered in advance in event processing unit 110, and each time an instruction is executed by state storage event detection unit 119, it is checked whether or not a state corresponding to the registered event condition occurs. If the registered event is detected, then this is reported to state storage unit 116 in state storage/restoration unit 107 through state storage event occurrence reporting unit 120. When the report of the occurrence of the event is received, state storage unit 116 stores a current debugged state into state storage file 118.

In the debugging apparatus of the present embodiment, a function to manage a situation upon storage of a debugged state is further added. In this connection, storage situation management unit 121 is additionally provided for state storage unit 116.

In storage situation management unit 121, upon production of state storage file 118, a file name and an event condition which has made the cause of the storage of a debugged state into the file, a storage time, a debugging object program name, current execution and so forth are stored in a correlated condition into storage situation management file 122.

Figure 4:
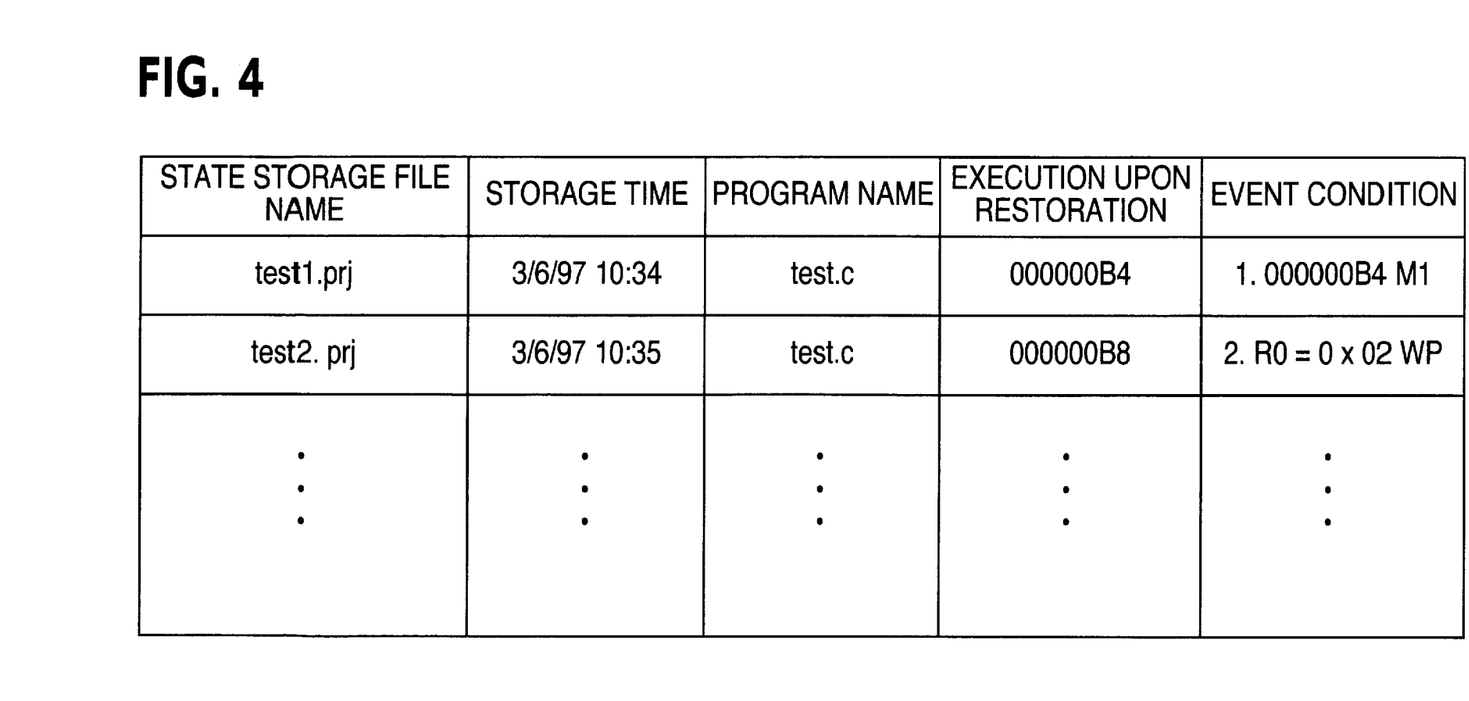
FIG. 4 is a table showing a state storage file list indicated by a storage situation management unit of Embodiment 1.

When a state restoration command is issued, storage situation management unit 121 displays a list of currently existing state storage files 118 based on storage situation management file 122. FIG. 4 shows an example of the list. If a file to be restored is selected from the information, then state restoration unit 117 reads in the file and restores the debugged state.

State storage unit 116 does not perform automatic storage of a debugged state after execution of several instructions or after issuance of several commands, which is a function of the conventional debugging apparatus. However, state storage unit 116 takes over the function of storing a debugged state when a state storage command is issued or when simulation debugging is completed. This is intended not to perform storage of a debugged state at any location other than a location at which the user determines necessary, and is effective also to improvement in processing performance of the debugging apparatus.

Figure 5A:
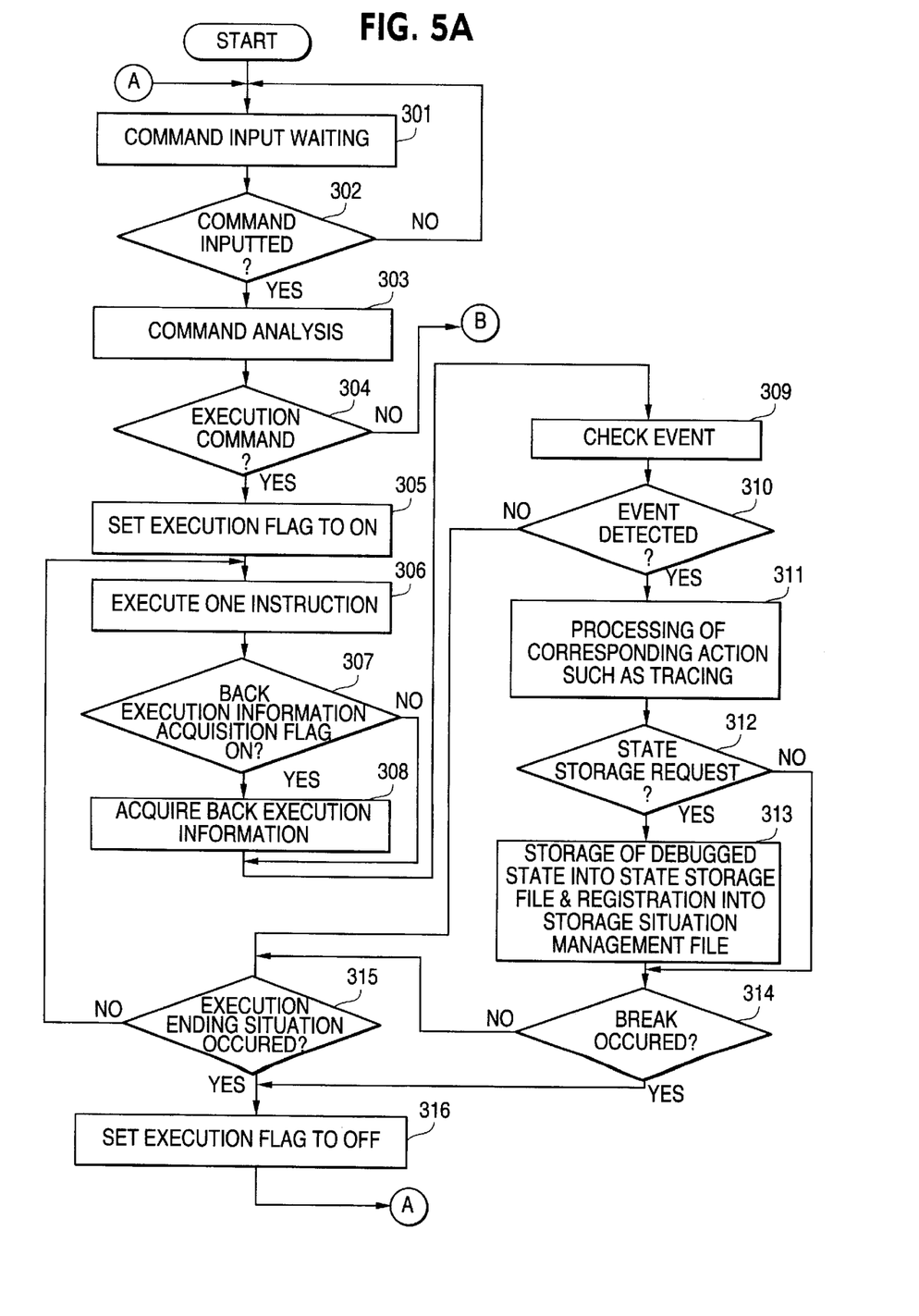
FIG. 5A is a flow chart illustrating a processing flow of a debugging method of Embodiment 1.
Figure 5B:
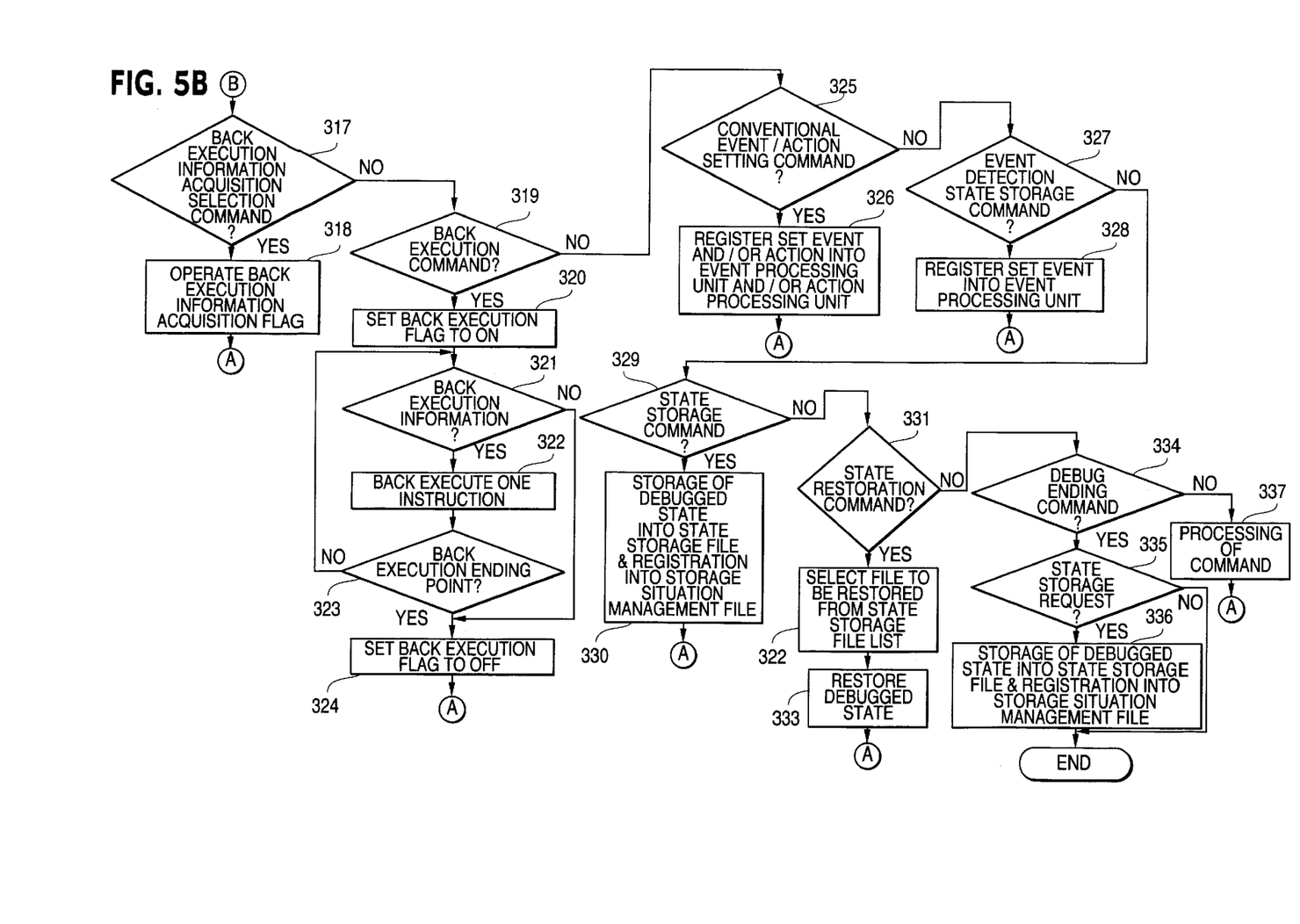
FIG. 5B is a flow chart illustrating a processing flow of the debugging method of Embodiment 1.

A debugging method of Embodiment 1 is described in detail with reference to the drawings. FIGS. 5A and 5B are flow charts illustrating a processing flow of the debugging method of Embodiment 1.

The debugging apparatus when started enters a command input waiting mode (301) and realizes simulation or debugging by receiving an inputted command from a user and performing operation corresponding to the command. If a command is inputted (302), then the debugging apparatus analyzes the command (303). In this instance, while the conventional apparatus increments the command counter for automatic state storage, in the present embodiment, this function is deleted. If a result of the command analysis proves that the command is an execution command (304), then an execution flag is set to ON (305) and an instruction is executed (306).

Then, debugging processing to be processed incidentally to the execution of the one instruction is performed. First, if a back execution information acquisition flag is ON (307), then information of a memory, a register or the like which has varied as a result of the present execution of the instruction is stored into a back execution information storage buffer (308). The ON/OFF operation of the back execution information acquisition flag is performed with a back execution information acquisition selection command as hereinafter described. Here, while, in the conventional apparatus, processing of incrementing the execution instruction number counter for automatic state holding and storing, if an instruction number determined by the system is reached, a debugged state and resetting the instruction number counter is performed, in the present embodiment, this function is deleted. Then, it is checked whether or not a state corresponding to one of events registered by the user is satisfied as a result of the execution of the instruction (309), and if an event is detected (310), then processing of an action registered in connection with the event is performed (311).

By the way, in the present embodiment, a function to storage a debugged state into a file if a certain event occurs is provided in addition to the conventional functions. Thus, it is assumed that an event for which storage processing of a debugged state is to be performed when the event occurs is registered in advance. In this instance, if the event is detected, then a state storage request is generated (312), and a current debugged state is stored into state storage file 118.

In the present embodiment, since also the function to manage a situation when a debugged state is stored is additionally provided, the situation upon the storage is registered simultaneously into storage situation management file 122 (313). If a request for a break is generated in response to the detection of the event (314), then the execution flag is changed to OFF (316), thereby ending the execution processing. When no event is detected or after processing other than breaking correlated to an event is completed, it is confirmed whether or not an execution ending condition occurs (315), and if an execution ending condition occurs, then the execution flag is changed to OFF (316). In any other case, a next instruction is executed (306).

If a back execution information acquisition selection command is inputted to the debugging apparatus (317), then the back execution information acquisition flag is set to ON when acquisition of back execution information is selected, but is set to OFF when back execution information is not to be acquired (318). If a back execution command is inputted (319), then the back execution flag is changed to ON (320), and if back execution information is available (321), back execution is performed by one-by-one-instruction based on the information (322). If back execution information is not available, then the execution flag is changed to OFF (324). Also when a back execution ending point designated by the user is reached (323), the back execution flag is changed to OFF (324). If an event setting command or an action setting command for a break or a trace is inputted (325), then the set event or action information is registered into event processing unit 110 or action processing unit 111 (326).

If a command to store a debugged state when a certain event occurs, which is additionally provided in the present embodiment, is inputted (327), this is registered into event processing unit 110 (328). If a state storage command is inputted (329), then current debug information is stored into a file and is registered simultaneously into storage situation management file 122 (330). If a state restoration command is inputted (331), a file to be restored is selected (332) from within the storage file list (FIG. 4) based on the storage situation management file which manages situations upon storage of a debugged state, which is a function additionally provided in the present embodiment, and the selected file is read in to restore the debugged state (333). Also for any other command, processing of the individual command is performed (337).

While, in the conventional debugging method, a current debugged state is stored when an instruction number determined by the system of the debugging apparatus is reached after processing of such commands is completed, in the debugging method of the present embodiment, the processing just described is not performed, but the debugging apparatus returns to the command input waiting condition (301). If a debug ending command is inputted (334), then it can be selected whether or not the current debugged state should be stored (335), and when necessary, storage of the current debugged state into a state storage file and registration into the storage situation management file are performed simultaneously (336), thereby ending the processing of the debugging apparatus.

Embodiment 2

In Embodiment 1, an example is described wherein storage and restoration of a debugged state are performed efficiently using the newly added two functions, that is, the function of storing a debugged state into a file if an event occurs and the function of managing the situation when a debugged state is stored. In Embodiment 2, an example wherein more precise retrieval of a debugged state to be restored is allowed by combining them with another debugging function.

In the present embodiment, while a debugged state can be stored at the timing of detection of an event, also setting such that trace information is acquired upon detection of the same event is possible. When setting so that trace information is also acquired simultaneously at a timing of storage of a debugged state is performed in this manner, in Embodiment 2, the storage situation management unit in Embodiment 1 additionally has a function of recording a debugged state storage timing into trace information.

More particularly, upon storage of a debugged state into a state storage file and registration into a storage situation management file in step 313 of FIG. 5A, information of the state storage file name and so forth is stored also into a buffer for trace information storage. Although the timing for storage of trace information appears also when a state storage command is issued or when a debugging ending command is issued (330, 336), if trace information can be acquired also at such timings, then registration into the trace buffer is performed simultaneously. An example of trace information in which debugged state storage file names are stored in this manner is shown in FIG. 6.

Figure 6:
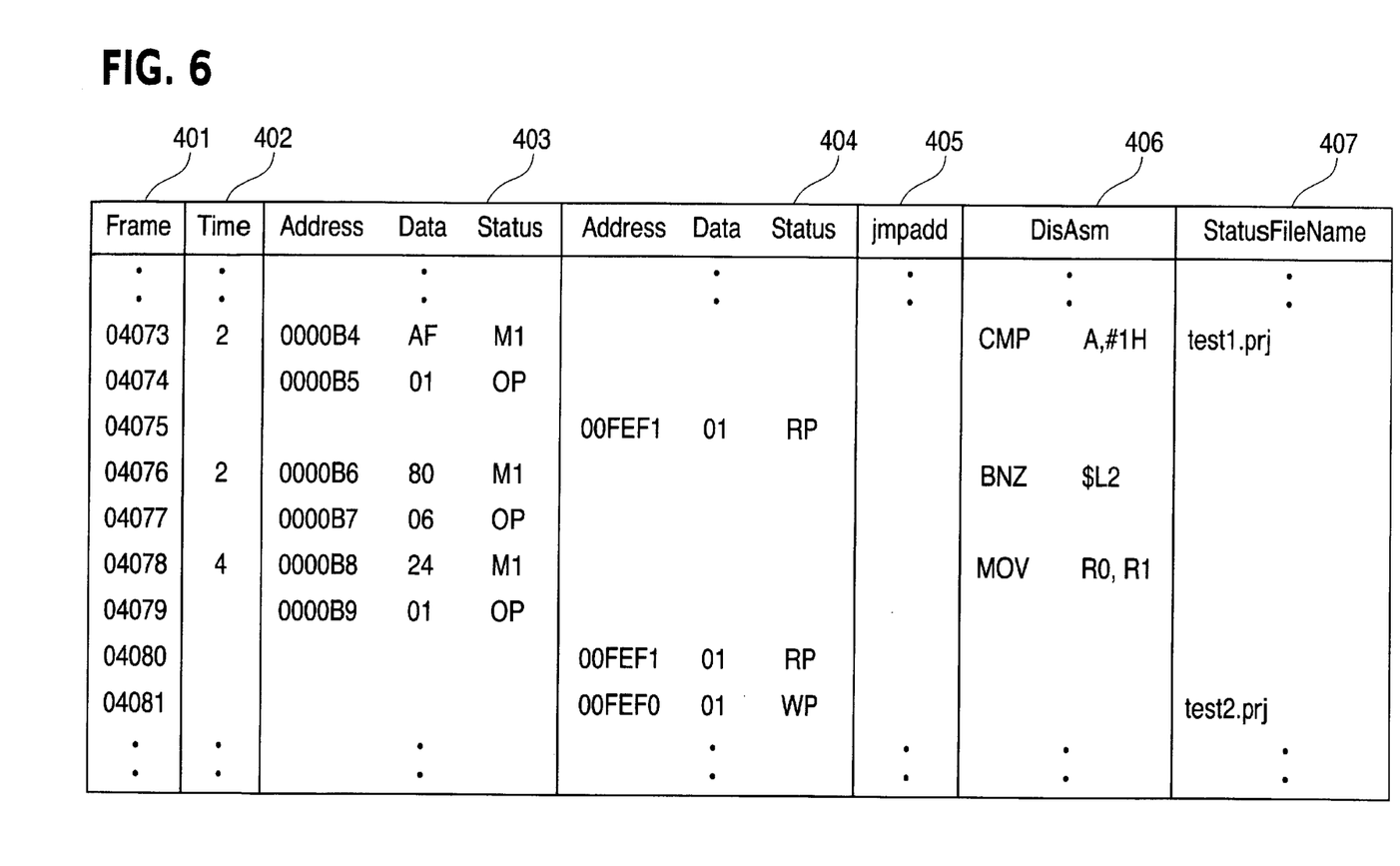
FIG. 6 is a table illustrating an example wherein a state storage file is filled in trace information by a storage situation management unit of Embodiment 2.

FIG. 6 is a view showing an example wherein state storage file names are filled into trace information by the storage situation management unit of Embodiment 2. In the example shown, two state storage information file names are filled in the trace information.

Here, the trace information is described. The trace frame item of 401 indicates a number of a trace frame. An older number indicates trace information acquired at an earlier timing. The time information of 402 indicates a required time from starting of execution of contents of the just preceding trace to starting of execution of contents of the current trace, as represented in units of a clock. 403 indicates a trace of a result of fetching of an instruction of a program. M1 represents fetching of the first byte of the instruction. OP represents fetching of the other bytes of the instruction. 404 indicates a result of accessing to data upon execution of the program. RP represents data reading by the program, and WP represents data writing by the program. 405 indicates an item which indicates an address of a branching destination. 406 indicates a disassemble representation of an instruction. From a disassemble representation, it can be discriminated to which instruction the trace information corresponds.

While the conventional trace information is such as described above, in Embodiment 2, the debugged state storage file name is recorded into 407 at a timing at which the debugged state is stored. Consequently, while, in Embodiment 1, the retrieval means for a state storage file only refers to the state storage file list of FIG. 4, in Example 2, also the retrieval means which refers to trace information is additionally provided, and specification of a debugged information file to be restored is facilitated by confirming a state storage file, a type of an execution instruction upon production of the file, a state of a memory and so forth.

While preferred embodiments of the present invention have been described using specific terms, such description is for illustrative purpose only, and it is to be understood that changes and variations may be made without departing from the spirit or scope of the following claims.

What is claimed is:

1. A debugging method for performing simulation and/or debugging of a microcomputer system based on a program using a debugging apparatus which includes a recording medium and an information inputting apparatus, a simulation unit having an ordinary execution unit and a back execution unit, a debugger unit having an event processing unit and an action processing unit, and a state storage/restoration unit having a state storage unit and a state restoration unit, comprising the steps of:

reporting, if an event set in advance is detected by said event processing unit upon execution of an instruction, detection information from said event processing unit to said state storage unit;

producing a state storage file based on the reported detection information by said state storage unit; and simultaneously storing a state storage file name and a situation upon the storage in a correlated condition into a storage situation management file by said state storage/restoration unit so that, when the debugged state is to be restored, by referring to the detected information, the state storage file can be determined readily from among existing state storage files.

2. A debugging apparatus for performing simulation and/or debugging of a microcomputer system based on a program, comprising:

a recording medium and an information inputting apparatus, a simulation unit having an ordinary execution unit and a back execution unit, a debugger unit having an event processing unit and an action processing unit, and a state storage/restoration unit having a state storage unit and a state restoration unit;

said event processing unit in said debugger unit including means for detecting occurrence of an event set in advance and storing a debugged state at a point of time when the event occurs;

said state storage unit in said state storage/restoration unit including means for managing a situation when the debugged state is stored.

3. A debugging apparatus as claimed in claim 2, wherein said means for managing a situation when the debugged state is stored records a debugged state storage file name to facilitate specification of a debugged information file to be restored.

4. A recording medium on which a simulation debug program is recorded in a computer-readable manner, the simulation debug program causing a computer to execute the steps of:

detecting an event set in advance as a state storage event when an instruction is executed;

producing a state storage file when the state storage event is detected;

storing a state storage file name and a situation upon the storage in a correlated condition into a storage situation management file; and retrieving storage situation management files when a certain debugged state is to be restored.

* * * * *